United States Patent
Du

(10) Patent No.: US 10,649,535 B2
(45) Date of Patent: May 12, 2020

(54) HAPTIC FEEDBACK GENERATION

(71) Applicant: Beijing Zhigu Rui Tuo Tech Co., Ltd., Beijing (CN)

(72) Inventor: Lin Du, Beijing (CN)

(73) Assignee: Beijing Zhigu Rui Tuo Tech Co., Ltd, Beijing (CN)

( * ) Notice: Subject to any disclaimer, the term of this patent is extended or adjusted under 35 U.S.C. 154(b) by 0 days.

(21) Appl. No.: 16/412,282

(22) Filed: May 14, 2019

(65) Prior Publication Data

US 2019/0265800 A1 Aug. 29, 2019

Related U.S. Application Data

(62) Division of application No. 15/311,519, filed as application No. PCT/CN2015/077919 on Apr. 30, 2015, now Pat. No. 10,345,906.

(30) Foreign Application Priority Data

May 16, 2014 (CN) .......................... 2014 1 0209027

(51) Int. Cl.
*G06F 3/01* (2006.01)
*G06F 3/041* (2006.01)

(52) U.S. Cl.
CPC ............ *G06F 3/016* (2013.01); *G06F 3/0416* (2013.01)

(58) Field of Classification Search
None
See application file for complete search history.

(56) References Cited

U.S. PATENT DOCUMENTS

| 8,274,386 | B1 | 9/2012 | Dea et al. |
| 9,317,117 | B2 | 4/2016 | Kono et al. |
| 2004/0267133 | A1 | 12/2004 | Podany |
| 2008/0122797 | A1 | 5/2008 | Soh et al. |

(Continued)

FOREIGN PATENT DOCUMENTS

| CN | 101907922 A | 12/2010 |
| CN | 102349041 A | 2/2012 |

(Continued)

OTHER PUBLICATIONS

International Search Report for PCT Application No. PCT/CN2015/077919, dated Jul. 17, 2015, 3 pages.

*Primary Examiner* — Kenneth B Lee, Jr.
(74) *Attorney, Agent, or Firm* — Amin, Turocy & Watson, LLP

(57) ABSTRACT

Haptic feedback generation methods and apparatuses relating to the field of haptic feedback are provided. The method comprises: in response to determining that a first part of a user body is touching a target position of an object, sending, by a device comprising a processor, a first mechanical wave to the object via a first medium comprising the first part; and sending, to the object via a second medium, a second mechanical wave that is used to form a haptic signal at the target position with the first mechanical wave, wherein the second medium comprises a second part, touching the object, of the user body. A source for forming the haptic signal can be at the target position, to cause that an effective haptic feedback to the user can be formed with little energy consumption, and poor experience of the user caused by vibration of an entire object is avoided.

20 Claims, 11 Drawing Sheets

(56) References Cited

U.S. PATENT DOCUMENTS

| | | |
|---|---|---|
| 2008/0132313 A1 | 6/2008 | Rasmussen |
| 2009/0167508 A1 | 7/2009 | Fadell |
| 2010/0013613 A1 | 1/2010 | Weston |
| 2010/0231367 A1 | 9/2010 | Cruz-Hernandez et al. |
| 2012/0062516 A1 | 3/2012 | Chen et al. |
| 2013/0201138 A1 | 8/2013 | Kono et al. |
| 2014/0089791 A1 | 3/2014 | Ishimaru |
| 2017/0115733 A1* | 4/2017 | Du .................. G06F 3/016 |

FOREIGN PATENT DOCUMENTS

| | | |
|---|---|---|
| CN | 103246397 A | 8/2013 |
| CN | 103760970 A | 4/2014 |
| CN | 103995591 A | 8/2014 |
| KR | 20100088849 A | 8/2010 |
| WO | 2013060933 A1 | 5/2013 |

\* cited by examiner

HAPTIC FEEDBACK GENERATION

RELATED APPLICATIONS

This patent application is a divisional of, and claims priority to each of, U.S. patent application Ser. No. 15/311,519, filed on Nov. 15, 2016, entitled "Haptic Feedback Generation", and now issued as U.S. Pat. No. 10,345,906, which is a U.S. National Stage filing under 35 U.S.C. § 371 of international patent cooperation treaty (PCT) application No. PCT/CN2015/077919, filed Apr. 30, 2015, and entitled "HAPTIC FEEDBACK GENERATION", which claims the benefit of priority to Chinese Patent Application No. 201410209027.1, filed on May 16, 2014, which applications are hereby incorporated into the present application by reference herein in their respective entireties.

TECHNICAL FIELD

The present application relates to the field of haptic feedback technologies, and in particular, to a haptic feedback generation method and apparatus.

BACKGROUND

Haptic feedback is a technology in which an apparatus gives a haptic feedback to a user operation. For example, when a user clicks a corresponding menu on a smart phone or a tablet computer, the apparatus may vibrate under drive of a built-in motor, to cause that the user may know that the apparatus has received an operation instruction. Haptic feedback is widely applied when a user drives a car or when observation is inconvenient for a user.

In an existing haptic feedback technology, a built-in motor drives vibration of the entire apparatus, which causes large energy consumption and affects user experience.

SUMMARY

An example, non-limiting objective of the present application is to provide a haptic feedback generation method and apparatus.

According to one example aspect of at least one embodiment of the present application, a haptic feedback generation method is provided, and comprises:

sending, through a first medium comprising a first part of a user body, a first mechanical wave to an object touched by the first part; and in response to that a second part of the user body touches a target position of the object, sending, to the object through a second medium, a second mechanical wave that is used to form a haptic signal at the target position with the first mechanical wave, wherein the second medium comprises the second part of the user body.

According to another example aspect of at least one embodiment of the present application, a haptic feedback generation method is provided, and comprises:

in response to that a first part of a user body touches a target position of an object, sending a first mechanical wave to the object through a first medium comprising the first part; and sending, to the object through a second medium, a second mechanical wave that is used to form a haptic signal at the target position with the first mechanical wave, wherein the second medium comprises a second part, touching the object, of the user body.

According to another example aspect of at least one embodiment of the present application, a haptic feedback generation apparatus is provided, and comprises:

a first sending module, configured to send, through a first medium comprising a first part of a user body, a first mechanical wave to an object touched by the first part; and a second sending module, configured to: in response to that a second part of the user body touches a target position of the object, send, to the object through a second medium, a second mechanical wave that is used to form a haptic signal at the target position with the first mechanical wave, wherein the second medium comprises the second part of the user body.

According to another example aspect of at least one embodiment of the present application, a haptic feedback generation apparatus is provided, and comprises:

a first sending module, configured to: in response to that a first part of a user body touches a target position of an object, send a first mechanical wave to the object through a first medium comprising the first part; and a second sending module, configured to send, to the object through a second medium, a second mechanical wave that is used to form a haptic signal at the target position with the first mechanical wave, wherein the second medium comprises a second part, touching the object, of the user body.

In methods and apparatuses of example embodiments of the present application, a source for forming a haptic signal is at a target position, to cause that an effective haptic feedback to a user can be formed with little energy consumption, and poor experience of the user caused by vibration of an entire object is avoided.

DETAILED DESCRIPTION

The following describes in detail the example embodiments of the present application with reference to the accompanying drawings and the embodiments. The following embodiments are used to describe the present application, rather than limiting a scope of the present application.

A person skilled in the art should understand that the sequence numbers of the following steps do not represent priorities of the executive sequences, and the executive sequences of each step should be determined according to functions and internal logics and should not make any limitation on the implementation process according to the embodiments of the present application.

In example embodiments of the present application, at least one of a first mechanical wave and a second mechanical wave may be an ultrasonic wave or a mechanical wave at another frequency band. The ultrasonic wave can be a wave having a frequency higher than 20000 Hz, which has good directivity, and strong penetrating power, can obtain acoustic energy that is relatively concentrated, and can be transmitted for a long distance in water, and about 65% of the human body is formed by water; therefore, the ultrasonic wave is suitable for transmission by using the human body as a transmission medium. Meanwhile, a frequency of the ultrasonic wave is beyond a listening scope of human beings; therefore, a user may not sense existence of ultrasonic wave, and no noise impact is imposed on the user.

Figure 1A:
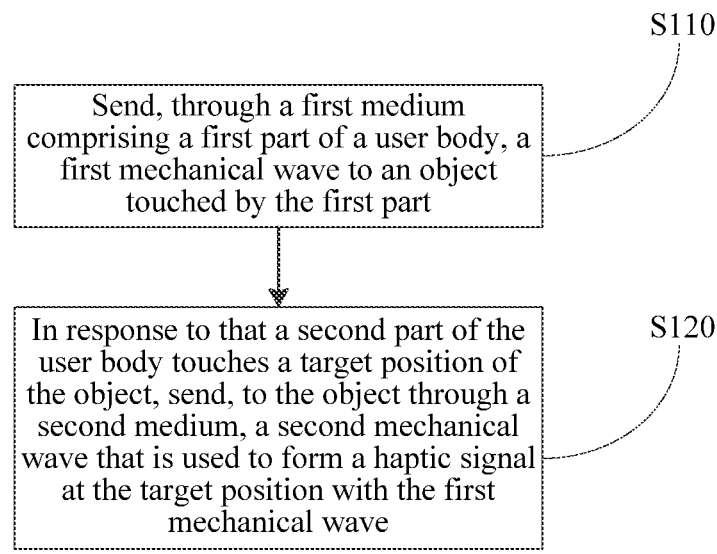
FIG. 1a is a flowchart of a haptic feedback generation method according to an example embodiment of the present application.

FIG. 1a is a flowchart of a haptic feedback generation method according to an embodiment of the present application. The method may be implemented on a haptic feedback generation apparatus. As shown in FIG. 1a, the method comprises:

S110: Send, through a first medium comprising a first part of a user body, a first mechanical wave to an object touched by the first part.

S120: In response to that a second part of the user body touches a target position of the object, send, to the object through a second medium, a second mechanical wave that is used to form a haptic signal at the target position with the first mechanical wave, wherein the second medium comprises the second part of the user body.

In a method of this embodiment of the present application, the first mechanical wave is sent, through the first medium comprising the first part of the user body, to the object touched by the first part, and in response to that the second part touches the object, the second mechanical wave is sent to the object through the second medium, wherein the first mechanical wave and the second mechanical wave are superposed at the touch position (that is, the target position) of the second part on the object to form the haptic signal, that is, a source for generating the haptic signal is at the target position, to cause that an effective haptic feedback to the user can be formed with little energy consumption, and poor experience of the user caused by vibration of an entire object is avoided.

The user body (comprising the first part and/or the second part) may directly touch the object, or may indirectly touch the object, for example, the user clicks the object with a glove on.

The first part and the second part may be any two different parts of the user body, for example, the first part comprises one hand of the user, and the second part comprises the other hand of the user. Certainly, the first part and the second part may also be different parts of a same hand, for example, the first part comprises a first sub-part (such as a palm) of one hand of the user, and the second part comprises a second sub-part (such as a thumb) of the hand of the user.

The object may be an apparatus such as a smart phone, a tablet computer, or a car-mounted display screen.

An implementation principle of the method in this embodiment is as follows:

assuming that an amplitude of the first mechanical wave is $A_0$, an initial phase is $\varphi_1$, and a frequency is $\omega_1$, an expression of the trigonometric function is:

$$\psi_1 = A_0 \cos(\varphi_1 - \omega_1 t);$$

assuming that an amplitude of the first mechanical wave is $A_0$, an initial phase is $\varphi_2$, and a frequency is $\omega_2$, an expression of the trigonometric function is:

$$\psi_2 = A_0 \cos(\varphi_2 - \omega_2 t); \text{ and}$$

therefore, an expression of the trigonometric function of a new mechanical wave obtained after superposition of the first mechanical wave and the second mechanical wave is:

$$\psi = \psi_1 + \psi_2 = 2A_0 \cos \frac{(\omega_1 + \omega_2)t - (\varphi_1 + \varphi_2)}{2} \cos \frac{(\omega_1 - \omega_2)t - (\varphi_1 - \varphi_2)}{2}.$$

As can be seen from the expression of the trigonometric function of the new mechanical wave, the new mechanical wave comprises a first component having a frequency being $(\omega_1 + \omega_2)/2$ and a second component having a frequency being $(\omega_1 - \omega_2)/2$. It is noted a sensitive-frequency interval of a vibration feedback for the skin of people can be 20 to 500 Hz. Therefore, assuming that the first mechanical wave and the second mechanical wave are ultrasonic waves (frequencies of the two waves are higher than 20000 Hz), the user cannot sense the wave, and the user also cannot sense a waveform component having a frequency being $(\omega_1 + \omega_2)/2$ in the new mechanical wave obtained through superposition. Meanwhile, $(\omega_1 - \omega_2)/2$ may be enabled to be between 20 to 500 Hz by appropriately controlling a difference between the frequency of the first mechanical wave and the frequency of the second mechanical wave, to cause that the user can sense a waveform component having a frequency being $(\omega_1 - \omega_2)/2$, and a haptic feedback signal is formed, for example, $\omega_1$ and $\omega_2$ are 40 kHz and 40.5 kHz respectively, and then, two frequency components comprised in the obtained new mechanical wave are 40.25 kHz and 250 Hz respectively, wherein the human body cannot sense the frequency component being 40.25 kHz, but can sense the frequency component being 250 Hz, to cause that the haptic feedback is obtained.

In addition, the first mechanical wave and the second mechanical wave are not necessarily ultrasonic waves, for example, a frequency $\omega_1$ of the first mechanical wave is 1000 Hz, and a frequency $\omega_2$ of the second mechanical wave is 1100 Hz; in this case, although ears of people can sense (that is, listen to) the two mechanical waves, the skin of people is not sensitive to the wave. Accordingly, the new mechanical wave obtained through superposition comprises a first component having a frequency being 1050 Hz and a second component having a frequency being 50 Hz, and the skin of the user is not sensitive to the second component (cannot sense the vibration), and is sensitive to the first component (senses the vibration), to cause that the haptic feedback may also be formed.

Figure 1B:
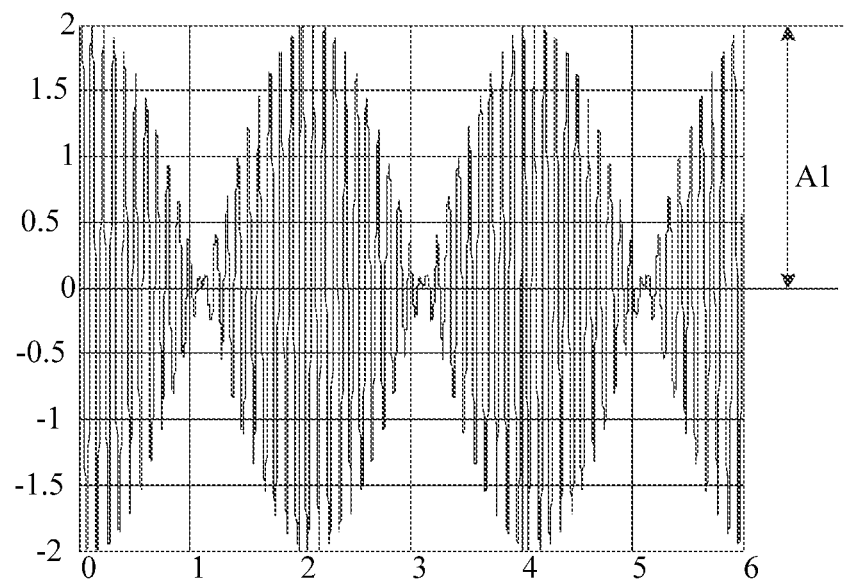
FIG. 1b is an example waveform diagram of a mechanical wave obtained through superposition when an amplitude of a first mechanical wave is the same as an amplitude of a second mechanical wave.

Assuming that a value of the amplitude $A_0$ is 1, a waveform diagram of a new mechanical wave obtained through simulation is shown in FIG. 1b, wherein an effective amplitude that the user can sense is $A_1=2=2 A_0$.

In addition, when amplitudes of the first mechanical wave and the second mechanical wave are different, a new mechanical wave obtained through superposition also can comprise the first component having a frequency being $(\omega_1+\omega_2)/2$ and a second component having a frequency being $(\omega_1-\omega_2)/2$. Besides, an effective amplitude that the user can sense always is two times a smaller value between the amplitude of the first mechanical wave and the amplitude of the second mechanical wave.

Figure 1C:
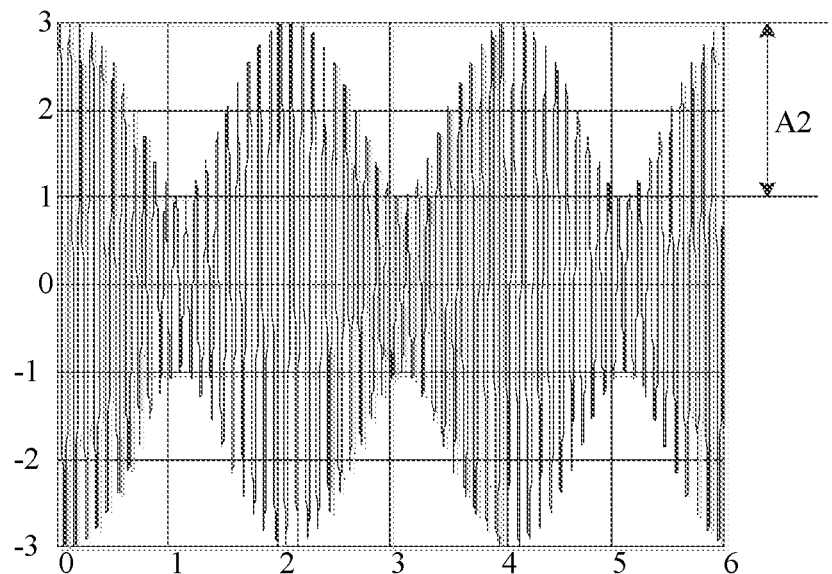
FIG. 1c is an example waveform diagram of a mechanical wave obtained through superposition when a ratio of an amplitude of a first mechanical wave to an amplitude of a second mechanical wave is 1:2.

For example, FIG. 1c is a waveform diagram of a new mechanical wave obtained when the amplitude $A_0$ of the first mechanical wave remains unchanged, and the amplitude of the second mechanical wave increases by one time (that is, the amplitude is 2 $A_0$). As can be seen, in this case, the effective amplitude that the user can sense is $A_2=2$, that is, equal to 2 $A_0$.

Figure 1D:
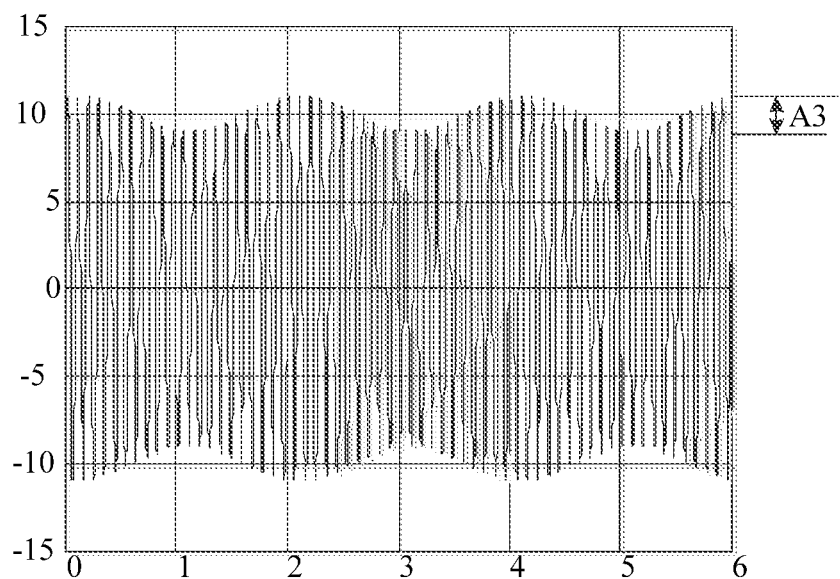
FIG. 1d is an example waveform diagram of a mechanical wave obtained through superposition when a ratio of an amplitude of a first mechanical wave to an amplitude of a second mechanical wave is 1:10.

For another example, FIG. 1d is a waveform diagram of a new mechanical wave obtained when the amplitude $A_0$ of the first mechanical wave remains unchanged, and the amplitude of the second mechanical wave increases by nine times (that is, the amplitude is 10 $A_0$). As can be seen, in this case, the effective amplitude that the user can sense is $A_3=2$, that is, equal to 2 $A_0$.

As can be seen, a smaller amplitude between the amplitude of the first mechanical wave and the amplitude of the second mechanical wave determines an effective amplitude that the user can sense; meanwhile, because the amplitude is in direct proportion to energy, a larger amplitude indicates more energy consumption; therefore, when the amplitude of the first mechanical wave is much closer to the amplitude of the second mechanical wave, that is, when a difference between the amplitude of the first mechanical wave at the target position and the amplitude of the second mechanical wave at the target position is smaller than a preset value (such as 1 um), the entire energy utilization is higher, and more energy is saved; otherwise, more energy is consumed. The amplitudes of the first mechanical wave and the second mechanical wave at the target position may be obtained through actual detection.

In addition, it may be understood that, the first part generally touches the object for a long time, for example, in a process in which the second part operates the object, the first part keeps touching the object, to cause that the first part and the object have a same initial vibration frequency, wherein the vibration frequency is the same as the frequency of the first mechanical wave, and the skin of the user cannot sense it. In response to that the second part touches the object, the haptic signal having the source being the target position may first enable the second part to obtain a haptic feedback (that is, the vibration that the skin can sense); generally, the first part may not receive the haptic signal, and only when a time for which the second part touches the object is greater than a threshold, that is, the haptic signal enables the entire object to vibrate, the first part obtains the haptic signal. Therefore, the haptic signal may be accurately transferred to the second part that actually operates the object, but not the first part that only holds the object.

As can be seen, when two initial mechanical waves having frequencies being a and b respectively are superposed, a new mechanical wave comprising two frequency components being (a+b)/2 and (a−b)/2 are generated. Assuming that the two initial mechanical waves are ultrasonic waves, for example, having frequencies being 40 kHz and 40.5 kHz, two frequency components comprised in the obtained new mechanical wave are 40.25 kHz and 250 Hz, wherein a human body cannot sense the frequency component being 40.25 kHz, but can sense the frequency component being 250 Hz, so as to obtain the haptic feedback.

The target position may correspond to different information. For example, assuming that the object is a smart phone, different positions on a display screen of the smart phone correspond to different APPs. When the second part of the user clicks different positions on the smart phone, the user actually operates different APPs, that is, different target positions correspond to different APPs. For another example, assuming that the object is a tablet computer displaying a game interface, as the game goes on, the same position on the tablet computer may correspond to different virtual objects, for example, with the change of time, one target position may correspond to stones, river water, clouds, or the like; in this way, when the user clicks the target position at different time points, the user actually operates different virtual objects, that is, at different time points, the same target position may correspond to different virtual objects. Therefore, to form different haptic feedbacks corresponding to different operation objects (for example, an APP or a virtual object), in an example embodiment, step S120 may comprise: acquiring information related to the target position. In addition, in step S120, the second mechanical wave is sent according to the information related to the target position.

Figure 2:
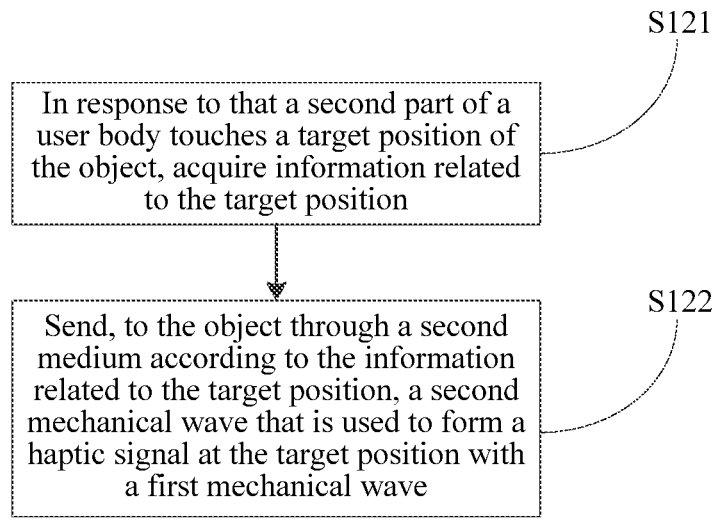
FIG. 2 is a detailed flowchart of step S120 in an example embodiment of the present application.
Figure 3:
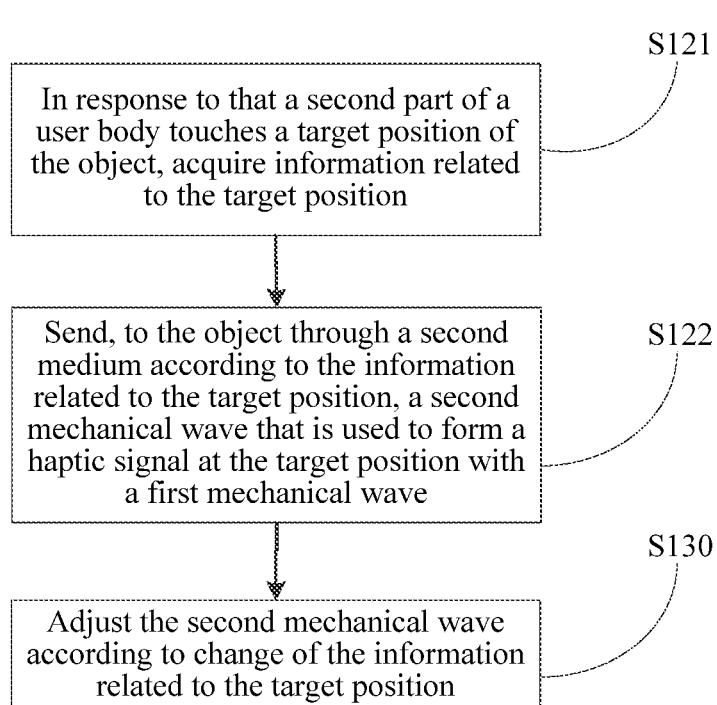
FIG. 3 is a flowchart of a method in an example embodiment of the present application.

Referring to FIG. 2, that is, an actual execution process of step S120 comprises:

S121: In response to that the second part of the user body touches the target position of the object, acquire the information related to the target position.

S122: Send, to the object through the second medium according to the information related to the target position, the second mechanical wave that is used to form the haptic signal at the target position with the first mechanical wave, wherein the second medium comprises the second part of the user body.

The information related to the target position may be coordinate information of the target position, or, may be display content corresponding to the target position. In addition, the information related to the target position may be acquired in a manner of communicating with the object, for example, in response to that the second part touches the target position, a request packet is sent to the object, and the object feeds back, according to the request packet, the information related to the target position.

The second mechanical wave is sent according to the information related to the target position, that is, different second mechanical waves are sent in correspondence to different operation objects, to cause that the haptic signal corresponds to the information related to the target position, and the user senses a haptic feedback corresponding to the operation object. For example, when a virtual object displayed at the target position is stones, a second mechanical wave B1 is sent, wherein a new mechanical wave obtained after superposition of the second mechanical wave B1 and the first mechanical wave enables the user to have a rough and solid touch feeling; for another example, when a virtual object displayed at the target position is river water, a second mechanical wave B2 is sent, wherein a new mechanical wave obtained after superposition of the second mechanical wave B2 and the first mechanical wave enables the user to have a soft and wet touch feeling.

When the user continuously operates the object, for example, the second part (such as a finger) of the user continuously clicks different positions on the screen of the tablet computer, or, the second part (such as a finger) of the user performs a touch and hold operation on the same position on the screen of the tablet computer, content displayed at the same position changes as the time changes. In order that different haptic feedbacks corresponding to different operation objects are formed for the user in this process, referring to 3, in an example embodiment, the method further comprises:

S130: Adjust the second mechanical wave according to change of the information related to the target position.

Accordingly, in this method, an adjusted second mechanical wave may also be sent, to cause that a new haptic signal is formed through superposition of the adjusted second mechanical wave and the first mechanical wave.

When the first mechanical wave is a fixed mechanical wave (for example, a universal mechanical wave specified in the industry), as described above, the second mechanical wave is sent only according to the information related to the target position. However, considering that the first mechanical wave may have multiple forms, in an example embodiment, in step S120, the second mechanical wave is sent according to a parameter of the first mechanical wave and the information related to the target position.

Figure 4:
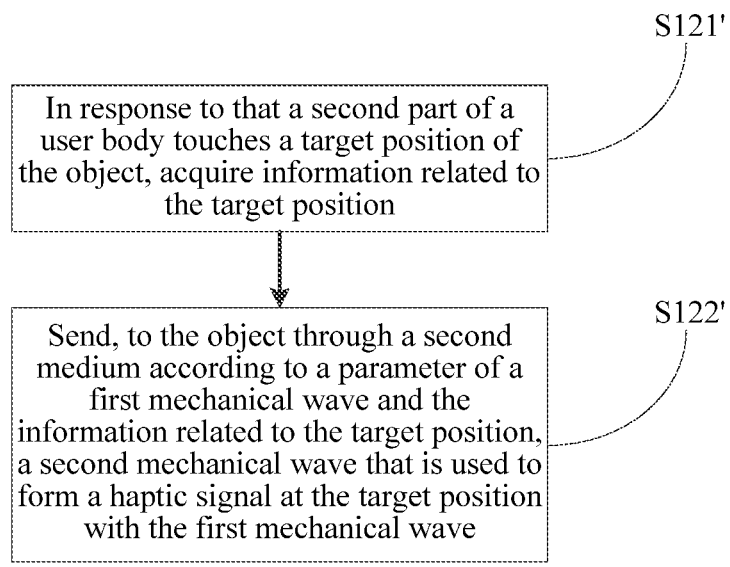
FIG. 4 is a detailed flowchart of step S120 in another example embodiment of the present application.

That is, Referring to FIG. 4, in this example embodiment, an actual execution process of step S120 comprises:

S121': In response to that the second part of the user body touches the target position of the object, acquire the information related to the target position.

S122': Send, to the object through the second medium according to the parameter of the first mechanical wave and the information related to the target position, the second mechanical wave that is used to form the haptic signal at the target position with the first mechanical wave, wherein the second medium comprises the second part of the user body.

In addition, this embodiment of the present application further provides a computer readable medium, comprising a computer readable instruction that is executed to perform the following operations: executing the operation of step S110 and step S120 of the method in the example embodiment shown in FIG. 1a.

In conclusion, in the method in this embodiment of the present application, a first mechanical wave and a second mechanical wave may be superposed at a target position of an object to form a haptic signal, and different second mechanical waves may also be sent according to information related to the target position (and a parameter of the first mechanical wave), so as to generate different haptic signals corresponding to the information related to the target position, thereby further improving user experience.

Figure 5:
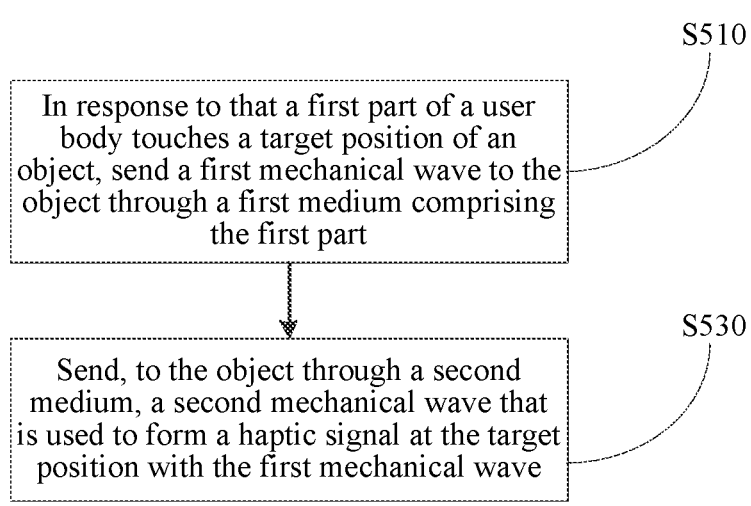
FIG. 5 is a flowchart of a haptic feedback generation method according to another example embodiment of the present application.

FIG. 5 is a flowchart of a haptic feedback generation method according to another embodiment of the present application. As shown in FIG. 5, the method comprises:

S510: In response to that a first part of a user body touches a target position of an object, send a first mechanical wave to the object through a first medium comprising the first part.

S530: Send, to the object through a second medium, a second mechanical wave that is used to form a haptic signal at the target position with the first mechanical wave, wherein the second medium comprises a second part, touching the object, of the user body.

In the method of this embodiment of the present application, in response to that the first part of the user body touches the target position of the object, the first mechanical wave is sent to the object through the first medium, and the second mechanical wave is sent to the object through the second medium, wherein the first mechanical wave and the second mechanical wave are superposed at the touch position (that is, the target position) of the first part on the object to form the haptic signal, that is, a source for forming the haptic signal is at the target position, to cause that an effective haptic feedback to the user can be formed with little energy consumption, and poor experience of the user caused by vibration of an entire object is avoided.

The user body (comprising the first part and/or the second part) may directly touch the object, or may indirectly touch the object, for example, the user clicks the object with a glove on. In addition, touch between the second part and the object may be continuous touch, for example, in a process in which the first part operates the object, the second part continuously touches the object.

The first part and the second part may be any two different parts of the user body, for example, the first part comprises one hand of the user, and the second part comprises the other hand of the user. Certainly, the first part and the second part may also be different parts of a same hand, for example, the first part comprises a first sub-part (such as a palm) of one hand of the user, and the second part comprises a second sub-part (such as a thumb) of the hand of the user.

The object may be an apparatus such as a smart phone, a tablet computer, or a car-mounted display screen.

An implementation principle of the method of this embodiment is similar to that of the foregoing embodiment, and no further details are provided herein again. However, the first part in this embodiment generally is a part that performs an actual operation on the object, and the second part generally is a part holding the object; therefore, the haptic signal is first received by the first part.

Figure 6:
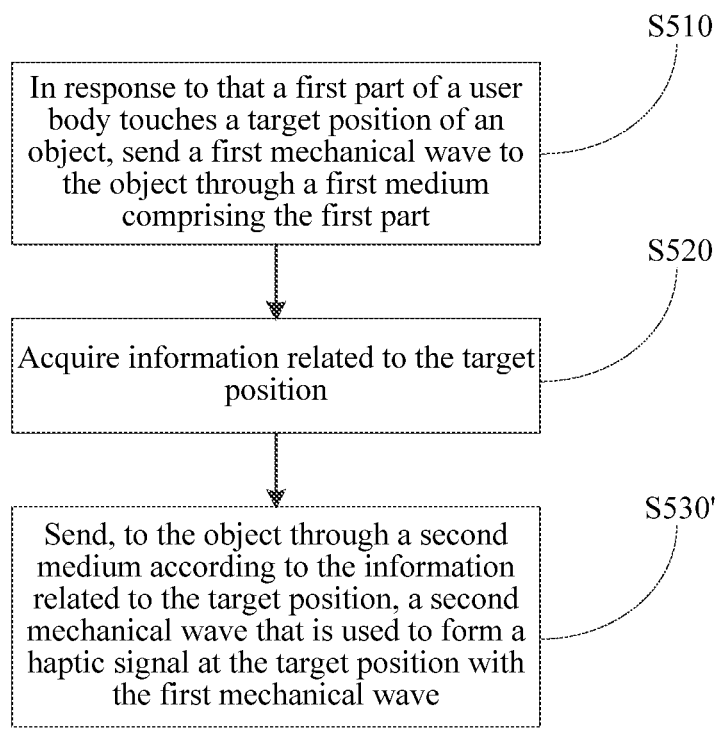
FIG. 6 is a flowchart of a method in an example embodiment of the present application.
Figure 7:
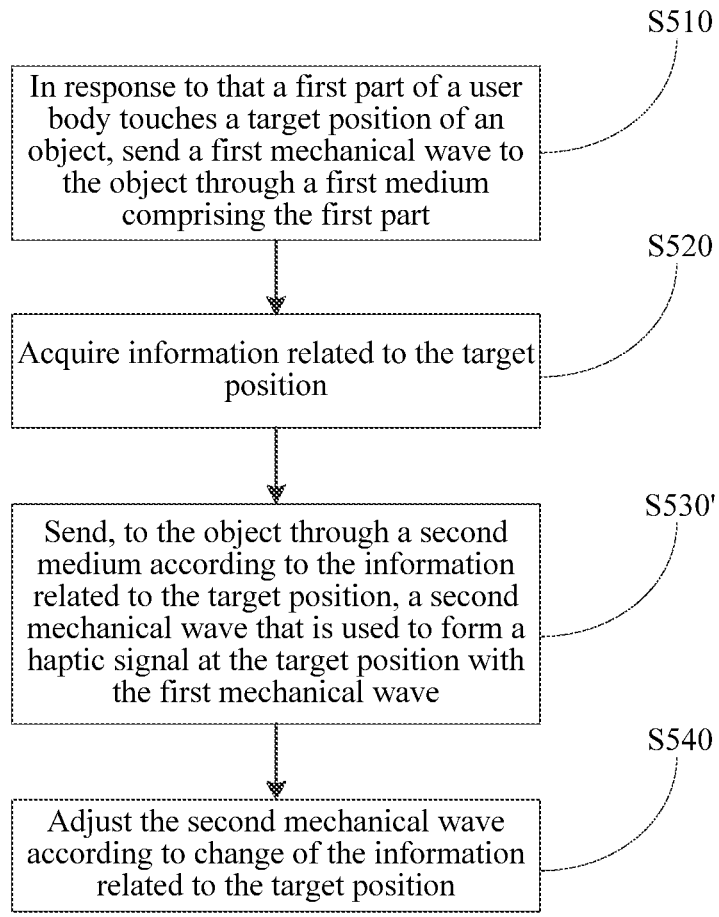
FIG. 7 is a flowchart of a method in another example embodiment of the present application.

The target position may correspond to different information. For example, assuming that the object is a smart phone, different positions on a display screen of the smart phone correspond to different APPs. When the second part of the user clicks different positions on the smart phone, the user actually operates different APPs, that is, different target positions correspond to different APPs. For another example, assuming that the object is a tablet computer displaying a game interface, as the game goes on, the same position on the tablet computer may correspond to different virtual objects, for example, with the change of time, one target position may correspond to stones, river water, clouds, or the like; in this way, when the user clicks the target position at different time points, the user actually operates different virtual objects, that is, at different time points, the same target position may correspond to different virtual objects. To form different haptic feedbacks corresponding to different operation objects (for example, an APP or a virtual object), referring to FIG. 6, the method may further comprise:

S520: Acquire information related to the target position.

In addition, in step S530, the second mechanical wave is sent according to the information related to the target position. That is, an actual execution process of step S530 comprises:

S530': Send, to the object through the second medium according to the information related to the target position, the second mechanical wave that is used to form the haptic signal at the target position with the first mechanical wave, wherein the second medium comprises the second part, touching the object, of the user body.

The information related to the target position may be coordinate information of the target position, or, may be display content corresponding to the target position. In addition, the information related to the target position may be acquired in a manner of communicating with the object, for example, in response to that the second part touches the target position, a request packet is sent to the object, and the object feeds back, according to the request packet, the information related to the target position.

The second mechanical wave is sent according to the information related to the target position, that is, different second mechanical waves are sent in correspondence to different operation objects, to cause that the haptic signal corresponds to the information related to the target position, and the user senses a haptic feedback corresponding to the operation object. For example, when a virtual object displayed at the target position is stones, a second mechanical wave B1 is sent, wherein a new mechanical wave obtained after superposition of the second mechanical wave B1 and the first mechanical wave enables the user to have a rough and solid touch feeling; for another example, when a virtual object displayed at the target position is river water, a second mechanical wave B2 is sent, wherein a new mechanical wave obtained after superposition of the second mechanical wave B2 and the first mechanical wave enables the user to have a soft and wet touch feeling.

When the user continuously operates the object, for example, the user continuously clicks different positions on the screen of the tablet computer, or, the user performs a touch and hold operation on the same position on the screen of the tablet computer, content displayed at the same position changes as the time changes. In order that different haptic feedbacks corresponding to different operation objects are formed for the user in this process, referring to 7, in an example embodiment, the method further comprises:

S540: Adjust the second mechanical wave according to change of the information related to the target position.

Accordingly, in this method, an adjusted second mechanical wave may also be sent, to cause that a new haptic signal is formed through superposition of the adjusted second mechanical wave and the first mechanical wave.

As can be seen, a difference between this embodiment and the previous embodiment also lies in that, the adjusted second mechanical wave in this embodiment is sent through the second medium, and the second part comprised in the second medium in this embodiment mainly holds the object.

When the first mechanical wave is a fixed mechanical wave (for example, a universal mechanical wave specified in the industry), as described above, the second mechanical wave is sent only according to the information related to the target position. However, considering that the first mechanical wave may have multiple forms, in an example embodiment, in step S530, the second mechanical wave is sent according to a parameter of the first mechanical wave and the information related to the target position.

In addition, this embodiment of the present application further provides a computer readable medium, comprising a computer readable instruction that is executed to perform the following operations: executing the operation of step S510 and step S530 of the method in the example embodiment shown in FIG. 5.

In conclusion, in the method in this embodiment of the present application, a first mechanical wave and a second mechanical wave may be superposed at a target position of an object to form a haptic signal, and different second mechanical waves may also be sent according to information related to the target position (and a parameter of the first mechanical wave), so as to generate different haptic signals corresponding to the information related to the target position, thereby further improving user experience.

Figure 8:
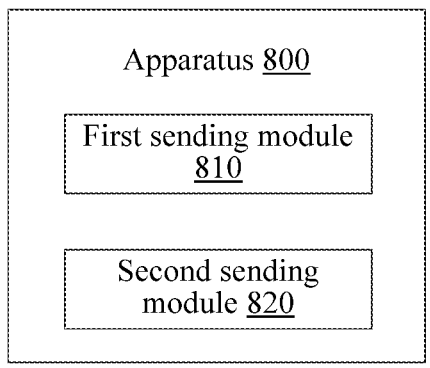
FIG. 8 is a schematic structural diagram of modules of a haptic feedback generation apparatus according to an example embodiment of the present application.

FIG. 8 is a schematic structural diagram of modules of a haptic feedback generation apparatus according to an embodiment of the present application. As shown in FIG. 8, the apparatus 800 may be a wearable apparatus such as a wrist strap or a ring, and may comprise:

a first sending module 810, configured to send, through a first medium comprising a first part of a user body, a first mechanical wave to an object touched by the first part; and a second sending module 820, configured to: in response to that a second part of the user body touches a target position of the object, send, to the object through a second medium, a second mechanical wave that is used to form a haptic signal at the target position with the first mechanical wave, wherein the second medium comprises the second part of the user body.

The object may be an apparatus such as a smart phone, a tablet computer, or a car-mounted display screen.

The user body (comprising the first part and/or the second part) may directly touch the object, or may indirectly touch the object, for example, the user clicks the object with a glove on.

The first part and the second part may be any two different parts of the user body, for example, the first part comprises one hand of the user, and the second part comprises the other hand of the user. Certainly, the first part and the second part may also be different parts of a same hand, for example, the first part comprises a first sub-part (such as a palm) of one hand of the user, and the second part comprises a second sub-part (such as a thumb) of the hand of the user.

Figure 9:
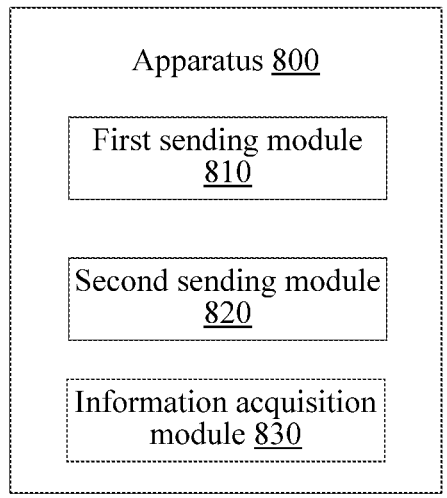
FIG. 9 is a schematic structural diagram of modules of a haptic feedback generation apparatus in an example embodiment of the present application.
Figure 10:
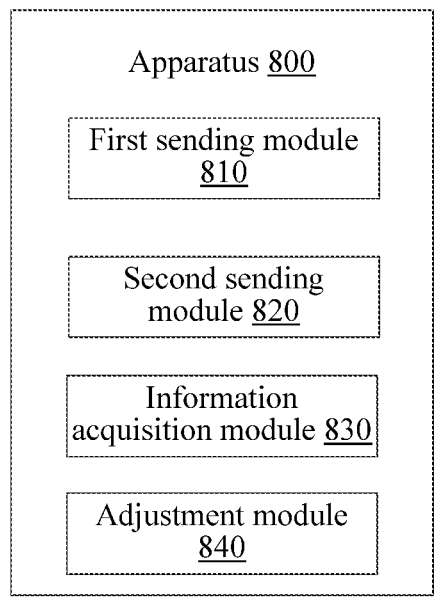
FIG. 10 is a schematic structural diagram of modules of a haptic feedback generation apparatus in another example embodiment of the present application.

The target position may correspond to different information. For example, assuming that the object is a smart phone, different positions on a display screen of the smart phone correspond to different APPs. When the second part of the user clicks different positions on the smart phone, the user actually operates different APPs, that is, different target positions correspond to different APPs. For another example, assuming that the object is a tablet computer displaying a game interface, as the game goes on, the same position on the tablet computer may correspond to different virtual objects, for example, with the change of time, one target position may correspond to stones, river water, clouds, or the like; in this way, when the user clicks the target position at different time points, the user actually operates different virtual objects, that is, at different time points, the same target position may correspond to different virtual objects. To form different haptic feedbacks corresponding to different operation objects (for example, an APP or a virtual object), referring to FIG. 9, in an example embodiment, the apparatus 800 may further comprise:

an information acquisition module 830, configured to acquire information related to the target position, that is, configured to: in response to that the second part of the user body touches the target position of the object, acquire the information related to the target position.

In addition, the second sending module 820 is configured to send the second mechanical wave according to the information related to the target position.

The information related to the target position may be coordinate information of the target position, or, may be display content corresponding to the target position. In addition, the information related to the target position may be acquired in a manner of communicating with the object, for example, in response to that the second part touches the target position, a request packet is sent to the object, and the object feeds back, according to the request packet, the information related to the target position.

When the user continuously operates the object, for example, the second part (such as a palm) of the user continuously clicks different positions on the screen of the tablet computer, or, the second part (such as a finger) of the user performs a touch and hold operation on the same position on the screen of the tablet computer, content displayed at the same position changes as the time changes. In order that different haptic feedbacks corresponding to different operation objects are formed for the user in this process, referring to 10, in an example embodiment, the apparatus 800 further comprises:

an adjustment module 840, configured to adjust the second mechanical wave according to change of the information related to the target position.

Accordingly, the second sending module 820 may also send an adjusted second mechanical wave, to cause that a new haptic signal is formed through superposition of the adjusted second mechanical wave and the first mechanical wave.

When the first mechanical wave is a fixed mechanical wave (for example, a universal mechanical wave specified in the industry), as described above, the second mechanical wave is sent only according to the information related to the target position. However, considering that the first mechanical wave may have multiple forms, in an example embodiment, the second sending module 820 is configured to send the second mechanical wave according to a parameter of the first mechanical wave and the information related to the target position.

In addition, to improve precision of the apparatus, the first sending module 810 may comprise an exciter array, wherein the exciter array comprises multiple array elements. By using this structure design and combined with the beamforming technology, the first mechanical wave may have better directivity, so as to form the haptic signal at the touch position more accurately.

Similarly, the second sending module 820 may comprise a second exciter array, wherein the second exciter array also comprises multiple array elements, so as to further improve precision of the apparatus.

Figure 11:
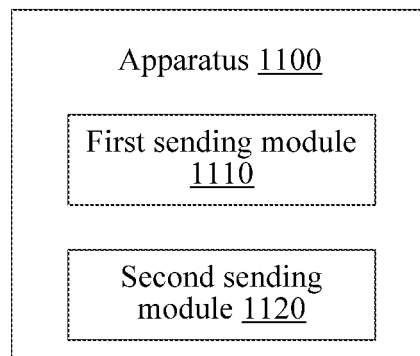
FIG. 11 is a schematic structural diagram of modules of a haptic feedback generation apparatus according to another example embodiment of the present application.

FIG. 11 is a schematic structural diagram of modules of a haptic feedback generation apparatus according to another embodiment of the present application. As shown in FIG. 11, the apparatus 1100 may be a wearable apparatus such as a wrist strap or a ring, and may comprise:

a first sending module 1110, configured to: in response to that a first part of a user body touches a target position of an object, send a first mechanical wave to the object through a first medium comprising the first part; and a second sending module 1120, configured to send, to the object through a second medium, a second mechanical wave that is used to form a haptic signal at the target position with the first mechanical wave, wherein the second medium comprises a second part, touching the object, of the user body.

The object may be an apparatus such as a smart phone, a tablet computer, or a car-mounted display screen.

The user body (comprising the first part and/or the second part) may directly touch the object, or may indirectly touch the object, for example, the user clicks the object with a glove on.

The first part and the second part may be any two different parts of the user body, for example, the first part comprises one hand of the user, and the second part comprises the other hand of the user. Certainly, the first part and the second part may also be different parts of a same hand, for example, the first part comprises a first sub-part (such as a palm) of one hand of the user, and the second part comprises a second sub-part (such as a thumb) of the hand of the user.

Figure 12:
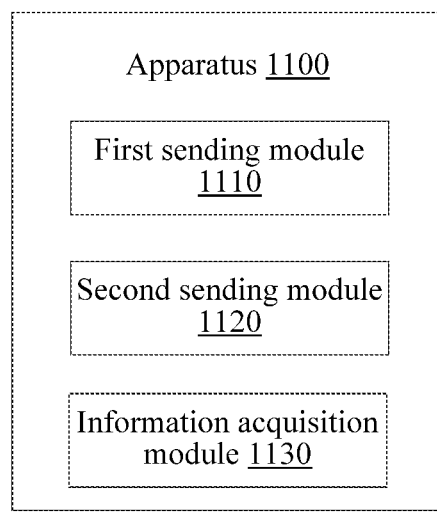
FIG. 12 is a schematic structural diagram of modules of a haptic feedback generation apparatus in an example embodiment of the present application.
Figure 13:
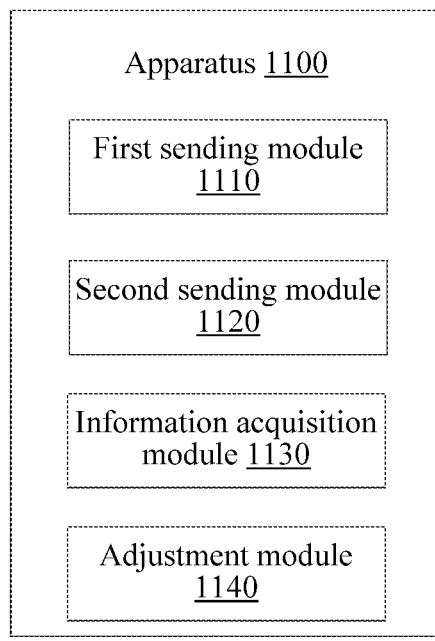
FIG. 13 is a schematic structural diagram of modules of a haptic feedback generation apparatus in another example embodiment of the present application.

The target position may correspond to different information. For example, assuming that the object is a smart phone, different positions on a display screen of the smart phone correspond to different APPs. When the second part of the user clicks different positions on the smart phone, the user actually operates different APPs, that is, different target positions correspond to different APPs. For another example, assuming that the object is a tablet computer displaying a game interface, as the game goes on, the same position on the tablet computer may correspond to different virtual objects, for example, with the change of time, one target position may correspond to stones, river water, clouds, or the like; in this way, when the user clicks the target position at different time points, the user actually operates different virtual objects, that is, at different time points, the same target position may correspond to different virtual objects. To form different haptic feedbacks corresponding to different operation objects (for example, an APP or a virtual object), referring to FIG. 12, the apparatus 1100 further comprises:

an information acquisition module 1130, configured to acquire information related to the target position, that is, in response to that the first part of the user body touches the target position of the object, acquire the information related to the target position.

In addition, the second sending module 1120 is configured to send the second mechanical wave according to the information related to the target position.

The information related to the target position may be coordinate information of the target position, or, may be display content corresponding to the target position. In addition, the information related to the target position may be acquired in a manner of communicating with the object, for example, in response to that the second part touches the target position, a request packet is sent to the object, and the object feeds back, according to the request packet, the information related to the target position.

When the user continuously operates the object, for example, the first part (such as a finger) of the user continuously clicks different positions on the screen of the tablet computer, or, the first part (such as a finger) of the user performs a touch and hold operation on the same position on the screen of the tablet computer, content displayed at the same position changes as the time changes. In order that different haptic feedbacks corresponding to different operation objects are formed for the user in this process, referring to 13, in an example embodiment, the apparatus 1100 further comprises:

an adjustment module 1140, configured to adjust the second mechanical wave according to change of the information related to the target position.

Accordingly, the second sending module 1120 may also send an adjusted second mechanical wave, to cause that a new haptic signal is formed through superposition of the adjusted second mechanical wave and the first mechanical wave.

When the first mechanical wave is a fixed mechanical wave (for example, a universal mechanical wave specified in the industry), as described above, the second mechanical wave is sent only according to the information related to the target position. However, considering that the first mechanical wave may have multiple forms, in an example embodiment, the second sending module 1120 is configured to send the second mechanical wave according to the parameter of the first mechanical wave and the information related to the target position.

In addition, to improve precision of the apparatus, the first sending module 1110 may comprise an exciter array, wherein the exciter array comprises multiple array elements. By using this structure design and combined with the beamforming technology, the first mechanical wave may have better directivity, so as to form the haptic signal at the touch position more accurately.

Similarly, the second sending module 1120 may comprise a second exciter array, wherein the second exciter array also comprises multiple array elements, so as to further improve precision of the apparatus.

Figure 14:
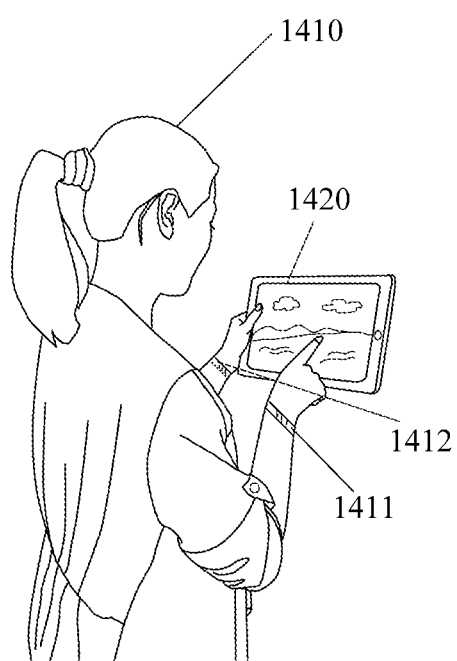
FIG. 14 is an example schematic diagram of an application scenario of a haptic feedback generation apparatus according to the present application.

FIG. 14 is a schematic diagram of an application scenario of a haptic feedback generation apparatus according to the present application. A user 1410 holds a tablet computer 1420 and plays a game, wherein a smart bracelet 1412 on the left hand continuously sends an ultrasonic wave to the tablet computer 1402 through the left hand, and in response to that a right index finger of the user 1410 clicks river water on a game interface, a smart wrist strap 1411 on the right hand of the user sends another ultrasonic wave to the tablet computer 1420 through the right hand; the two ultrasonic waves are superposed at the touch position of the right index finger of the user 1410 on the tablet computer 1420, and the right index finger of the user 1410 senses a haptic feedback signal that the river water flows.

In addition, in response to that the user 1410 clicks other places on the game interface, for example, the cloud on the sky, by adjusting the ultrasonic wave sent by the smart wrist strap 1411 on the right hand and/or the smart wrist strap 1412 on the left hand, the right index finger of the user 1410 may sense a new haptic feedback signal.

Figure 15:
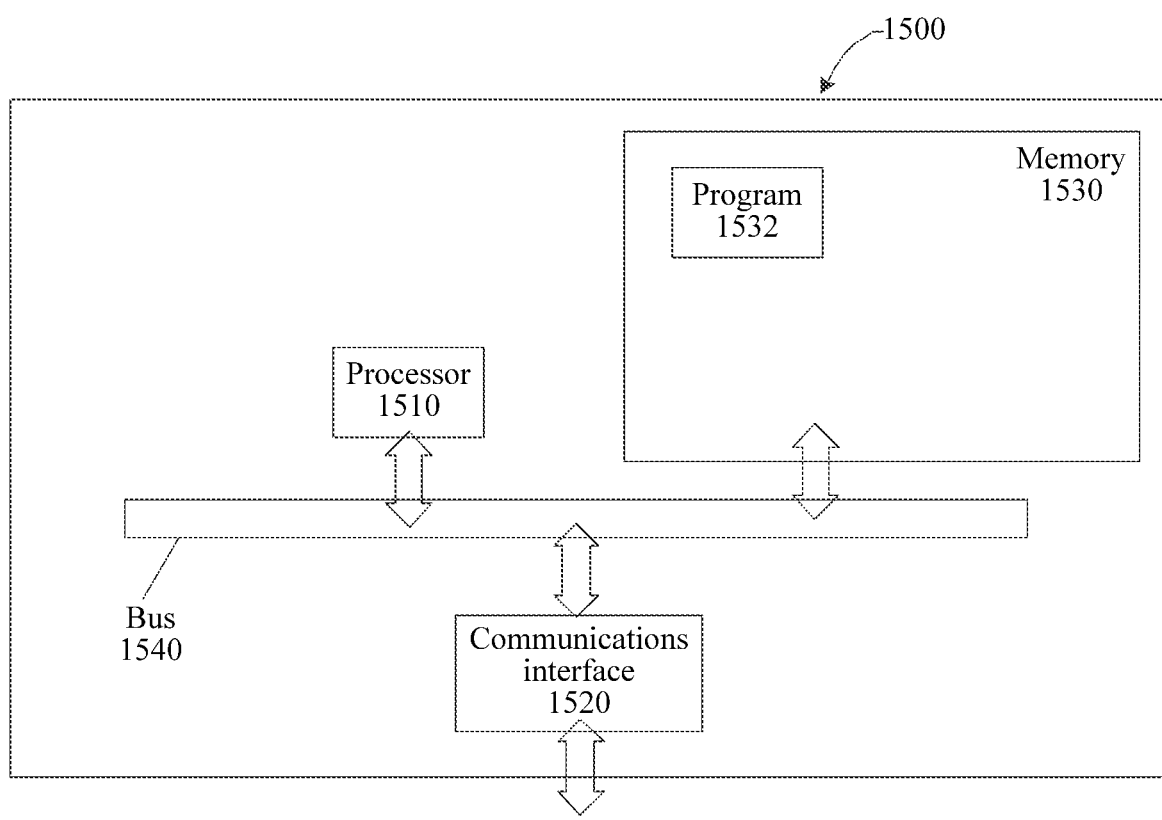
FIG. 15 is a schematic structural diagram of hardware of a haptic feedback generation apparatus according to an example embodiment of the present application.

A hardware structure of a haptic feedback generation apparatus according to an embodiment of the present application is shown in FIG. 15. The specific embodiment of the present application does not limit a specific implementation of the haptic feedback generation apparatus. Referring to FIG. 15, the apparatus 1500 may comprise:

a processor 1510, a communications interface 1520, a memory 1530, and a communications bus 1540, wherein:

the processor 1510, the communications interface 1520, and the memory 1530 communicate with each other by using the communications bus 1540.

The communications interface 1520 is configured to communicate with another network element.

The processor 1510 is configured to execute a program 1532, and specifically, may execute related steps in the method embodiment shown in FIG. 1.

Specifically, the program 1532 may comprise program code, wherein the program code comprises a computer operation instruction.

The processor 1510 may be a central processing unit (CPU), or an application specific integrated circuit (ASIC), or one or more integrated circuits configured to implement the embodiments of the present application.

The memory 1530 is configured to store the program 1532. The memory 1530 may comprise a high speed random access memory (RAM), or a non-volatile memory, for example, at least one magnetic memory. The program 1532 specifically may execute the following steps:

sending, through a first medium comprising a first part of a user body, a first mechanical wave to an object touched by the first part; and in response to that a second part of the user body touches a target position of the object, sending, to the object through a second medium, a second mechanical wave that is used to form a haptic signal at the target position with the first mechanical wave, wherein the second medium comprises the second part of the user body.

For specific implementations of the steps in the program 1532, reference may be made to corresponding steps or modules in the foregoing embodiment, and no further details are provided herein again. A person skilled in the art may clearly know that, for convenient and brief description, for the specific working process of the foregoing apparatus and module, reference may be made to the corresponding descriptions in the foregoing method embodiment, and no further details are provided herein again.

Figure 16:
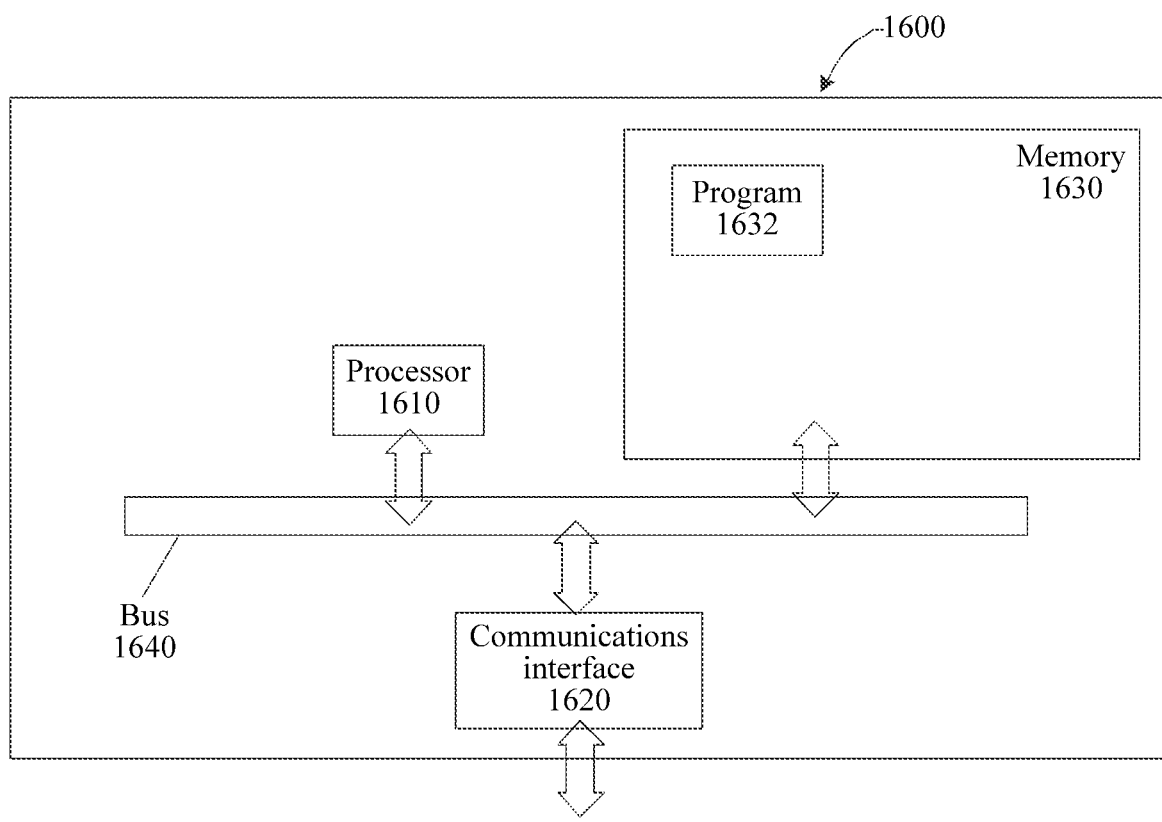
FIG. 16 is a schematic structural diagram of hardware of a haptic feedback generation apparatus according to another example embodiment of the present application.

A hardware structure of a haptic feedback generation apparatus according to an embodiment of the present application is shown in FIG. 16. The specific embodiment of the present application does not limit a specific implementation of the haptic feedback generation apparatus. Referring to FIG. 16, the apparatus 1600 may comprise:

a processor 1610, a communications interface 1620, a memory 1630, and a communications bus 1640, wherein:

the processor 1610, the communications interface 1620, and the memory 1630 communicate with each other by using the communications bus 1640.

The communications interface 1620 is configured to communicate with another network element.

The processor 1610 is configured to execute a program 1632, and specifically, may execute related steps in the method embodiment shown in FIG. 5.

Specifically, the program 1632 may comprise program code, wherein the program code comprises a computer operation instruction.

The processor 1610 may be a central processing unit (CPU), or an application specific integrated circuit (ASIC), or one or more integrated circuits configured to implement the embodiments of the present application.

The memory 1630 is configured to store the program 1632. The memory 1630 may comprise a high speed RAM memory, or a non-volatile memory, for example, at least one magnetic memory. The program 1632 specifically may execute the following steps:

in response to that a first part of a user body touches a target position of an object, sending a first mechanical wave to the object through a first medium comprising the first part; and sending, to the object through a second medium, a second mechanical wave that is used to form a haptic signal at the target position with the first mechanical wave, wherein the second medium comprises a second part, touching the object, of the user body.

For specific implementations of the steps in the program 1632, reference may be made to corresponding steps or modules in the foregoing embodiment, and no further details are provided herein again. A person skilled in the art may clearly know that, for convenient and brief description, for the specific working process of the foregoing apparatus and module, reference may be made to the corresponding descriptions in the foregoing method embodiment, and no further details are provided herein again.

A person of ordinary skill in the art may be aware that, with reference to the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer apparatus (which may be a personal computer, a controller, a network apparatus, or the like) to perform all or a part of the steps of the methods described in the embodiments of the present application. The foregoing storage medium comprises: any medium that can store program code, such as a USB flash drive, a removable hard disk, a read-only memory (ROM), a RAM, a magnetic disk, or an optical disc.

The foregoing example embodiments are merely used for describing the present application, rather than limiting the present application. A person of ordinary skill in the art may make various changes and modifications without departing from the spirit and scope of the present application, and therefore, all equivalent technical solutions shall belong to the scope of the present application, and the protection scope of the present application shall be subject to the claims.

What is claimed is:

1. A method, comprising:
   in response to determining that a first part of a user body is touching a target position of an object, sending, by a device comprising a processor, a first mechanical wave to the object via a first medium comprising the first part; and
   sending, to the object via a second medium, a second mechanical wave that is used to form a haptic signal at the target position with the first mechanical wave, wherein the second medium comprises a second part, touching the object, of the user body.

2. The method according to claim 1, further comprising:
   acquiring information related to the target position.

3. The method according to claim 2, wherein the sending the second mechanical wave comprises sending the second mechanical wave according to the information related to the target position.

4. The method according to claim 2, wherein the sending the second mechanical wave comprises sending the second mechanical wave according to a parameter of the first mechanical wave and the information related to the target position.

5. The method according to claim 2, further comprising:
   adjusting the second mechanical wave according to a change of the information related to the target position.

6. An apparatus, comprising:
   a memory that stores executable modules; and
   a processor, coupled to the memory, that executes or facilitates execution of the executable modules, comprising:
      a first sending module configured to: in response to determining that a first part of a user body is touching a target position of an object, send a first mechanical wave to the object via a first medium comprising the first part; and
      a second sending module configured to send, to the object via a second medium, a second mechanical wave that is used to form a haptic signal at the target position with the first mechanical wave, wherein the second medium comprises a second part, touching the object, of the user body.

7. The apparatus according to claim 6, wherein the executable components further comprise:
   an information acquisition module configured to acquire information related to the target position.

8. The apparatus according to claim 7, wherein the second sending module is configured to send the second mechanical wave according to the information related to the target position.

9. The apparatus according to claim 7, wherein the second sending module is configured to send the second mechanical wave according to a parameter of the first mechanical wave and the information related to the target position.

10. The apparatus according to claim 7, wherein the executable components further comprise:
    an adjustment module configured to adjust the second mechanical wave according to a change of the information related to the target position.

11. A computer readable storage device, comprising at least one executable instruction, which, in response to execution, causes a haptic feedback generation apparatus comprising a processor to perform operations, comprising:
    in response to determining that a first part of a user body is touching a target position of an object, sending a first mechanical wave to the object via a first medium comprising the first part; and
    sending, to the object via a second medium, a second mechanical wave that is used to form a haptic signal at the target position with the first mechanical wave, wherein the second medium comprises a second part, touching the object, of the user body.

12. The computer readable storage device according to claim 11, wherein the operations further comprise:
    acquiring information related to the target position.

13. The computer readable storage device according to claim 12, wherein the sending the second mechanical wave comprises sending the second mechanical wave according to the information related to the target position.

14. The computer readable storage device according to claim 12, wherein the haptic signal corresponds to the information related to the target position.

15. The computer readable storage device according to claim 11, wherein the haptic signal is formed through superposition of the first mechanical wave and the second mechanical wave.

16. A haptic feedback generation apparatus, characterized by comprising a processor and a memory, the memory storing executable instructions, the processor being connected to the memory via a communication bus, and when the haptic feedback generation apparatus operates, the processor executes the computer executable instructions stored in the memory, so that the haptic feedback generation apparatus executes operations, comprising:

in response to a determination that a first part of a user body touches a target position of an object, sending a first mechanical wave to the object via a first medium comprising the first part; and sending, to the object via a second medium, a second mechanical wave that is used to form a haptic signal at the target position with the first mechanical wave, wherein the second medium comprises a second part, touching the object, of the user body.

17. The haptic feedback generation apparatus according to claim 16, wherein the operations further comprise:

acquiring information related to the target position, wherein the sending the second mechanical wave comprises sending the second mechanical wave according to the information related to the target position.

18. The haptic feedback generation apparatus according to claim 17, wherein a difference between a first amplitude of the first mechanical wave at the target position and a second amplitude of the second mechanical wave at the target position is less than a preset value.

19. The haptic feedback generation apparatus according to claim 16, wherein the first part comprises one hand of the user, and the second part comprises another hand of the user, or wherein the first part comprises a first sub-part of the one hand of the user, and the second part comprises a second sub-part of the one hand of the user.

20. The haptic feedback generation apparatus according to claim 16, wherein at least one of the first mechanical wave or the second mechanical wave is an ultrasonic wave.

* * * * *